US009886153B2

(12) United States Patent
Huang et al.

(10) Patent No.: US 9,886,153 B2
(45) Date of Patent: Feb. 6, 2018

(54) TOUCH SENSING METHOD AND SYSTEM FOR AVOIDING DISPLAY NOISES

(71) Applicant: FocalTech Systems Co., Ltd., Hsinchu (TW)

(72) Inventors: Hsin-Mao Huang, Hsinchu (TW); Hsiang-Cheng Yu, Taoyuan (TW); Shu-Ming Fan, Hsinchu (TW)

(73) Assignee: FORCALTECH SYSTEMS CO., LTD., Hsinchu (TW)

( * ) Notice: Subject to any disclaimer, the term of this patent is extended or adjusted under 35 U.S.C. 154(b) by 58 days.

(21) Appl. No.: 15/011,856

(22) Filed: Feb. 1, 2016

(65) Prior Publication Data
US 2016/0357315 A1    Dec. 8, 2016

(30) Foreign Application Priority Data

Jun. 3, 2015 (TW) ............................. 104118042 A

(51) Int. Cl.
| | | |
|---|---|---|
| *G06F 3/045* | (2006.01) | |
| *G06F 3/044* | (2006.01) | |
| *G06F 3/041* | (2006.01) | |

(52) U.S. Cl.
CPC ............ *G06F 3/044* (2013.01); *G06F 3/0418* (2013.01)

(58) Field of Classification Search
USPC ........................................ 345/156, 174, 173
See application file for complete search history.

(56) References Cited

U.S. PATENT DOCUMENTS

| | | | | |
|---|---|---|---|---|
| 2013/0147744 A1* | 6/2013 | Kim | ...................... | G06F 3/0412 345/173 |
| 2014/0071088 A1* | 3/2014 | Hong | .................... | G06F 3/0416 345/174 |
| 2014/0347320 A1* | 11/2014 | Ribeiro | ................. | G06F 3/0412 345/174 |
| 2014/0368467 A1* | 12/2014 | Park | ........................ | G06F 3/044 345/174 |
| 2015/0293636 A1* | 10/2015 | Park | ...................... | G06F 3/0418 345/174 |
| 2016/0109980 A1* | 4/2016 | Lee | .......................... | G06F 3/044 345/174 |
| 2016/0109981 A1* | 4/2016 | Lin | ......................... | G06F 3/044 345/174 |
| 2016/0109988 A1* | 4/2016 | Wang | ..................... | G06F 3/046 345/173 |

(Continued)

*Primary Examiner* — Thuy Pardo
(74) *Attorney, Agent, or Firm* — Bacon & Thomas, PLLC

(57) ABSTRACT

A touch sensing system for avoiding display noises includes a touch display panel, a display driver integrated circuit and a touch control integrated circuit. The display driver integrated circuit is connected to the touch display panel for performing a display operation. The touch control integrated circuit is connected to the touch display panel and the display driver integrated circuit. The touch control integrated circuit performs a touch sensing on the touch display panel in a vertical blanking interval based on a vertical synchronous signal to generate a first set of touch position data, and perform a touch sensing on the touch display panel in a non-vertical blanking interval to generate a second set of touch position data. The touch control integrated circuit updates the second set of touch position data based on the first set of touch position data.

12 Claims, 11 Drawing Sheets

(56) References Cited

U.S. PATENT DOCUMENTS

2016/0195988 A1* 7/2016 Fu .................. G06F 3/0416 345/174
2016/0253021 A1* 9/2016 Syu .................. G06F 3/041 345/174
2016/0282995 A1* 9/2016 Lee .................. G06F 3/044 345/174

* cited by examiner

|    | S1  | S2  | S3  | S4 | S5 | S6  | S7  | S8  | S9  | S10 |
|----|-----|-----|-----|-----|-----|-----|-----|-----|-----|-----|
| D1 | 5   | -3  | -12 | 19  | 31  | -21 | 13  | 14  | -21 | -11 |
| D2 | 8   | 0   | 3   | 13  | -7  | 4   | -10 | -9  | 6   | 3   |
| D3 | 9   | -17 | 5   | 14  | 10  | -18 | 10  | -1  | 5   | -1  |
| D4 | -3  | 0   | -21 | 0   | 30  | 0   | -11 | -17 | 0   | -18 |
| D5 | -1  | 12  | 4   | -8  | -2  | -10 | -18 | 0   | -18 | -4  |
| D6 | -4  | 0   | -18 | -6  | 60  | 22  | -3  | -4  | 3   | -10 |
| D7 | -17 | 14  | 10  | 131 | 155 | 57  | 6   | -9  | -12 | -3  |
| D8 | -11 | -23 | -4  | 121 | 42  | 82  | -9  | -11 | 4   | 0   |
| D9 | 3   | 6   | 63  | 62  | 43  | 27  | 12  | 5   | -17 | -10 |
| D10| -10 | 0   | -18 | -7  | -10 | -21 | 3   | 14  | -10 | -1  | first set of touch position data (Data1)

real touch position

FIG. 11A

|    | S1  | S2  | S3  | S4 | S5 | S6  | S7  | S8  | S9  | S10 |
|----|-----|-----|-----|----|----|-----|-----|-----|-----|-----|
| D1 | 5   | -3  | -12 | 19 | 31 | -21 | 13  | 14  | -21 | -11 |
| D2 | 8   | 0   | 3   | 13 | -7 | -4  | -10 | -9  | 6   | 3   |
| D3 | -9  | -17 | 5   | 14 | 100 | 18 | 10  | -1  | 5   | -1  |
| D4 | -3  | 0   | -21 | 0  | 30 | 0   | -11 | -17 | 0   | -18 |
| D5 | -1  | 12  | 4   | -8 | -2 | -10 | -18 | 0   | -18 | -4  |
| D6 | -4  | 0   | -18 | -6 | 60 | 22  | -3  | -4  | 3   | -10 |
| D7 | -17 | 14  | 10  | 131 | 156 | 57 | 6   | -9  | -12 | -3  |
| D8 | -11 | -23 | -4  | 131 | 142 | 82 | -9  | -11 | 4   | 0   |
| D9 | 3   | 6   | -9  | 62 | 43 | 27  | 12  | 5   | -17 | -10 |
| D10| -10 | 0   | -18 | -7 | -10 | -21 | 3  | 14  | -10 | -1  | second set of touch position data (Data2)

false point real touch position

TOUCH SENSING METHOD AND SYSTEM FOR AVOIDING DISPLAY NOISES

BACKGROUND OF THE INVENTION

1. Field of the Invention

The present invention relates to the technical field of touch control and, more particularly, to a touch sensing method and system for avoiding display noises.

2. Description of Related Art

The principle of a touch panel is based on different sensing manners to detect voltage, current, acoustic wave, or infrared for determining the coordinate of a touch point on a screen as touched by a finger or other medium such as stylus. For example, the resistive touch sensing technology makes use of a voltage difference between an upper electrode and a lower electrode to calculate the position of a point being pressed so as to detect the position of the touch point, and the capacitive touch sensing technology makes use of a capacitance change generated from static electricity combined between the arranged transparent electrodes and the finger of a human body so as to generate a current or voltage for determining the coordinate of the touching point. Therefore, with the capacitive touch sensing, a miniature capacitance change is employed to detect whether there are one or more touch points existed.

The capacitive touch sensing technology is to detect a capacitance change generated when a finger touches a touch panel so as to determine whether there is a touch occurred. FIG. 1 is a schematic diagram of a capacitive touch sensing technology. As shown in FIG. 1, in case of no noise interference, a sensing capacitance Cp is generated between the finger and the sense electrode 110, and the capacitance change of the sensing capacitance Cp is measured by a sensing circuit 120 so as to obtain data of the touch position. However, the capacitance change of the sensing capacitance Cp is very weak and thus is susceptible to noises, resulting in an erroneous measurement. Therefore, when a touch panel is attached onto a liquid crystal display (LCD) panel, the touch panel is susceptible to noises generated by the display panel.

The typical capacitive touch system has to measure the capacitance change on the touch panel by the sensing circuit so as to obtain data of touch position thereby calculating the coordinate of each position touched by the user. However, in the process of obtaining the touch data, the touch data is likely to shift or distort due to the noise interference in the sensing circuit, the touch panel, or even the driving circuit, the interference caused by external noise to ground, and the noise interference in the display panel or inside integrated circuits. It results in appearance of noise points as shown in FIG. 2, disappearance of the actual touch points, or coordinate offset. FIG. 2 schematically illustrates a touch sensing result with noise interference. As shown in FIG. 2, the real touch position is at the intersection of D6 and S1, however, the capacitive touch system would also report the intersection of D2 and S1 and the intersection of D2 and S3 as touch positions due to the noise interference. An erroneous measurement of the touch position occurs.

The noise interference from the display panel is usually unavoidable when the touch position is detected. When it occurs, the erroneous touch data is likely to be detected. To eliminate the affection of noise interference from the display panel, various methods have been developed.

In general, this problem can be solved directly by inserting one isolation layer between the touch panel and the display panel. FIG. 3 illustrates the aforementioned solution for noise reduction. As shown in FIG. 3, there is an electric field shielding layer 330 between a touch sensing layer 310 and a liquid crystal layer 320 for isolating the noises generated when a liquid crystal driving electrode layer 340 drives the liquid crystal layer 320, so as to avoid the touch sensing layer 310 from being interfered by the noises. There are disadvantages in this solution, unable to lower the manufacturing cost and restriction on the configuration for instance. FIG. 4 schematically illustrates the configuration of an embodiment using the electric field shielding layer 330. As shown in FIG. 4, due to the electric field shielding layer 330, the whole thickness of the touch display system is increased as well as the thickness of end product, resulting in a negative influence to the portability of the compact electronic products. In addition, in an in-cell or on-cell touch display panel, the touch components are arranged inside the display panel, and thus it is unable to insert the electric field shielding layer 330 into the display panel, so that the noises cannot be isolated by using the electric field shielding layer 330.

FIG. 5 schematically illustrates another solution by using an air gap to isolate noises and this solution is provided by Maxim, a touch IC manufacturer. As shown in FIG. 5, a gasket 510 is provided between an X-direction touch sensor and a display module to form an air gap for isolating the noises generated by the display module. However, the aforementioned problem cannot be eliminated by this solution.

To overcome the problem, a non-air-gap technique is proposed. The non-air-gap is to adhere an external glass (or a touch panel) directly to the display panel by a glue. Due to a vacuum formed between the glass and the display panel, the noises do not affect the operations of the touch panel. However, the yield of this technique is poor because a full adhesion between the display panel and touch panel is required, and the adhesion is getting more and more difficult as size of the display panel is increased. It would cause a huge loss when the adhesion fails. In addition, for an in-cell capacitive touch sensing, this method cannot be used because the typical in-cell capacitive touching sensors are arranged in the liquid crystal layer. As a result, in order to avoid damaging the feature of the liquid crystal display panel, this technique cannot be adopted.

In addition, it is applicable to use a filter to filter out the noises. Such a way is suitable for various touch panels, but it requires a noise simulation, which inevitably spends a lot of time on development of the filter and to increase the manufacturing cost of integrated circuits.

There is another method proposed to suppress the display noises by enlarging the voltage to increase signal to noise ratio (SNR). Although such a method surely can increase the accuracy of touch sensing, it is unable to effectively suppress the noises.

For the requirement on marketing, in addition to the function of touch sensing, a portable device also has to be provided with the function of hovering touch. FIG. 6 is a schematic diagram of a typical hovering touch. As shown in FIG. 6, the hovering touch requires accurately detecting the position of a finger on a touch panel when the finger is placed over, but not contacting, the touch panel. At this moment, the amount of capacitance change of the capacitance Cp generated by the finger being approached to the touch panel becomes extremely weaker, and thus the touch sensing is very difficult to perform if the level of the touch signal sensed by the sensing circuit is close to that of a noise. Namely, the hovering touch becomes more difficult if the display noise cannot be avoided.

For achieving the hovering touch, a typical in-cell configuration applied with an in-cell touch sensing is provided as shown in FIG. 7. Since the touch components are arranged inside the display panel, the touch sensing surely has to avoid the frame change time of the display panel, so as not to be affected by the display noise. Therefore, the display noise under this configuration can be eliminated theoretically. However, because the touch components have to be arranged inside the display panel, the yield is not improved yet.

Therefore, it is desirable to provide an improved touch sensing system and method to mitigate and/or obviate the aforementioned problems.

SUMMARY OF THE INVENTION

The object of the present invention is to provide a touch sensing method and system for avoiding display noises, which is free of noise interference without increasing the thickness of the touch sensing system and compatible with the on-cell or in-cell technique, so as to increase the accuracy of the touch sensing and effectively reduce the manufacturing cost.

In one aspect of the present invention, a touch sensing method for avoiding display noises is provided. The touch sensing method is applied to a touch display system, which has a touch display panel, a display driver integrated circuit, and a touch control integrated circuit, the display driver integrated circuit driving the touch display panel for displaying image, the touch control integrated circuit driving the touch display panel based on a vertical synchronous signal outputted from the display driver integrated circuit to detect at least one touch position on the touch display panel. The touch sensing method comprises steps of: (A) the touch control integrated circuit detecting the vertical synchronous signal to determine whether a vertical blanking interval is initiated; (B) when the vertical blanking interval has been initiated in step (A), the touch control integrated circuit performing a touch sensing on the touch display panel, so as to generate a first set of touch position data; (C) the touch control integrated circuit determining whether to output the first set of touch position data; (D) the first set of touch position data is outputted in step (C), the touch control integrated circuit performing a first operation to the first set of touch position data and a second set of touch position data, so as to update the first set of touch position data for output; (E) the touch control integrated circuit performing a touch sensing to the touch display panel in a non-vertical blanking interval, so as to generate a set of touch position data and update the set of touch position data as the second set of touch position data; (F) the touch control integrated circuit performing a second operation on the second set of touch position data and the first set of touch position data, so as to update the second set of touch position data for output; (G) the touch control integrated circuit calculating a coordinate of the touch position in the vertical blanking interval based on the first set of touch position data outputted in step (D) and calculating a coordinate of the touch position in the non-vertical blanking interval based on the second set of touch position data outputted in step (F); (H) the touch control integrated circuit outputting a coordinate of the touch position; and (I) the touch control integrated circuit determining whether the touch sensing in the non-vertical blanking interval is completed and, if yes, executing step (A).

In another aspect of the present invention, a touch sensing system for avoiding display noises is provided. The touch sensing system comprises: a touch display panel for displaying image and detecting a touch position; a display driver integrated circuit connected to the touch display panel for driving transistors and capacitors of corresponding pixels based on a display pixel signal and a display driving signal thereby performing a display operation; and a touch control integrated circuit connected to the touch display panel and the display driver integrated circuit; wherein the touch control integrated circuit performs a touch sensing on the touch display panel in a vertical blanking interval based on a vertical synchronous signal outputted from the display driver integrated circuit to generate a first set of touch position data, and perform a touch sensing on the touch display panel in a non-vertical blanking interval to generate a second set of touch position data, so that the touch control integrated circuit updates the second set of touch position data based on the first set of touch position data.

Other objects, advantages, and novel features of the present invention will become more apparent from the following detailed description when taken in conjunction with the accompanying drawings.

BRIEF DESCRIPTION OF THE DRAWINGS

FIGS. 11A to 11C are schematic diagrams illustrating the operations of the touch sensing system according to the present invention.

DETAILED DESCRIPTION OF THE PREFERRED EMBODIMENT

Figure 1:
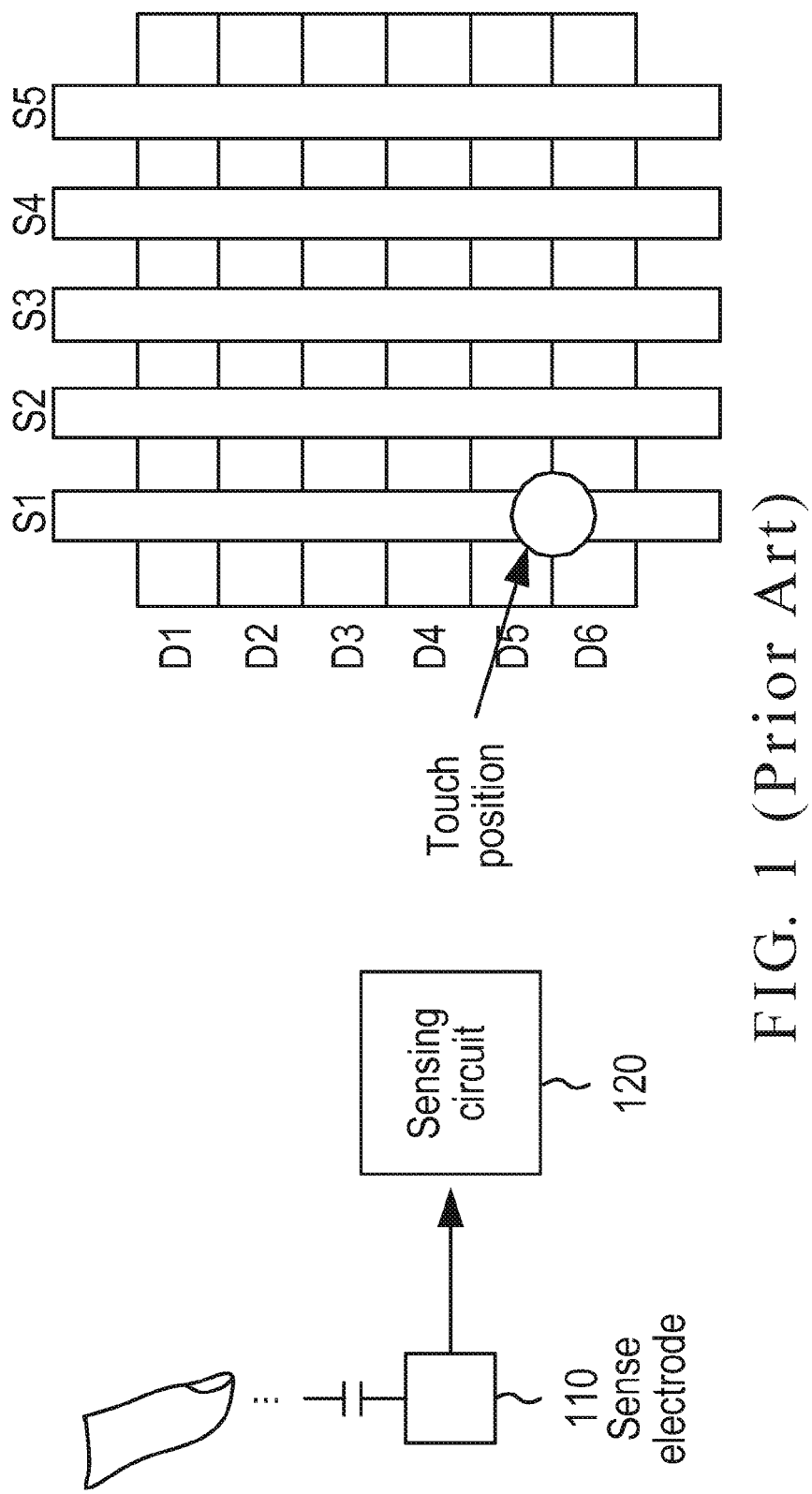
FIG. 1 is a schematic diagram of a typical capacitive touch sensing scheme.
Figure 2:
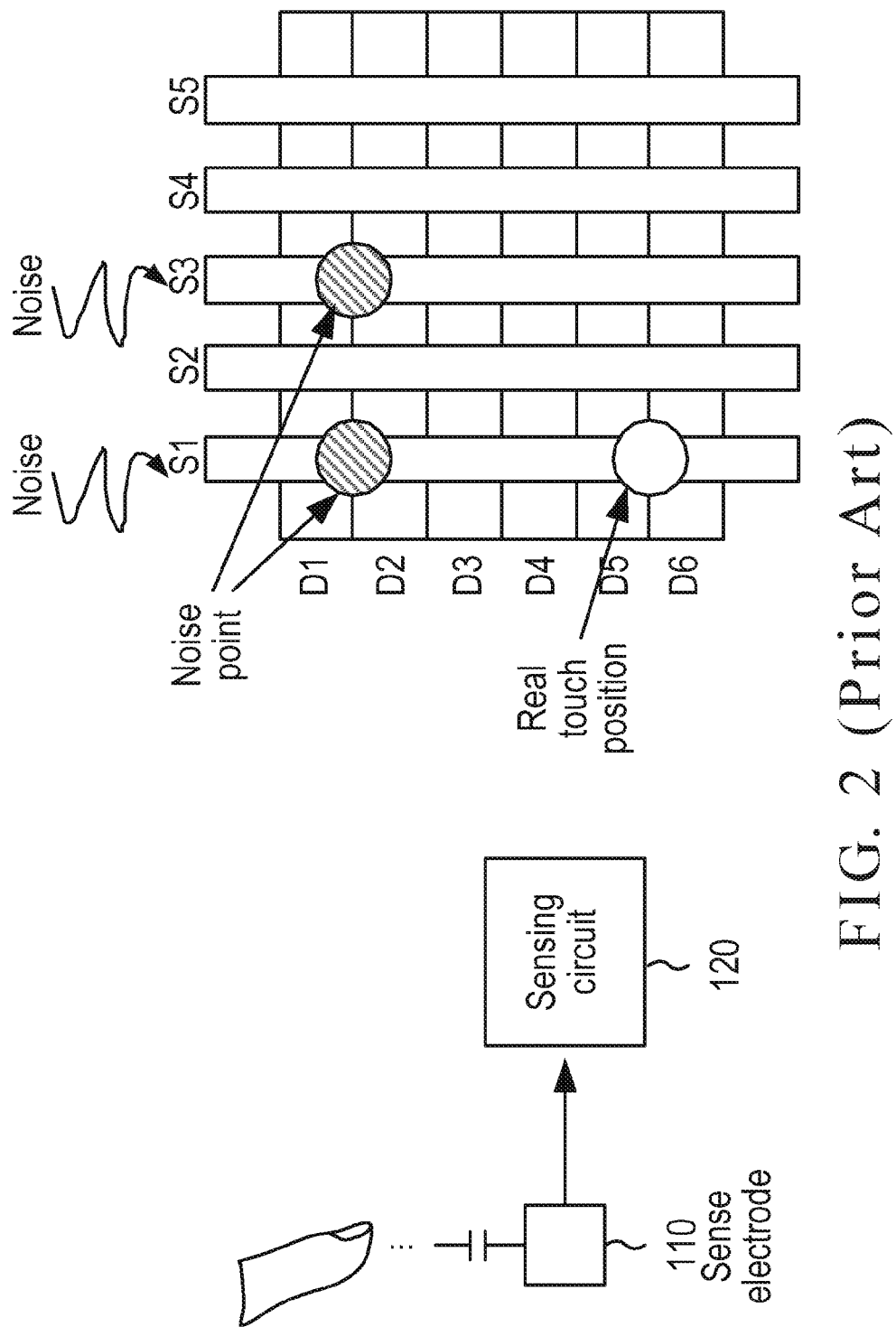
FIG. 2 schematically illustrates a touch sensing result with noise interference.
Figure 3:
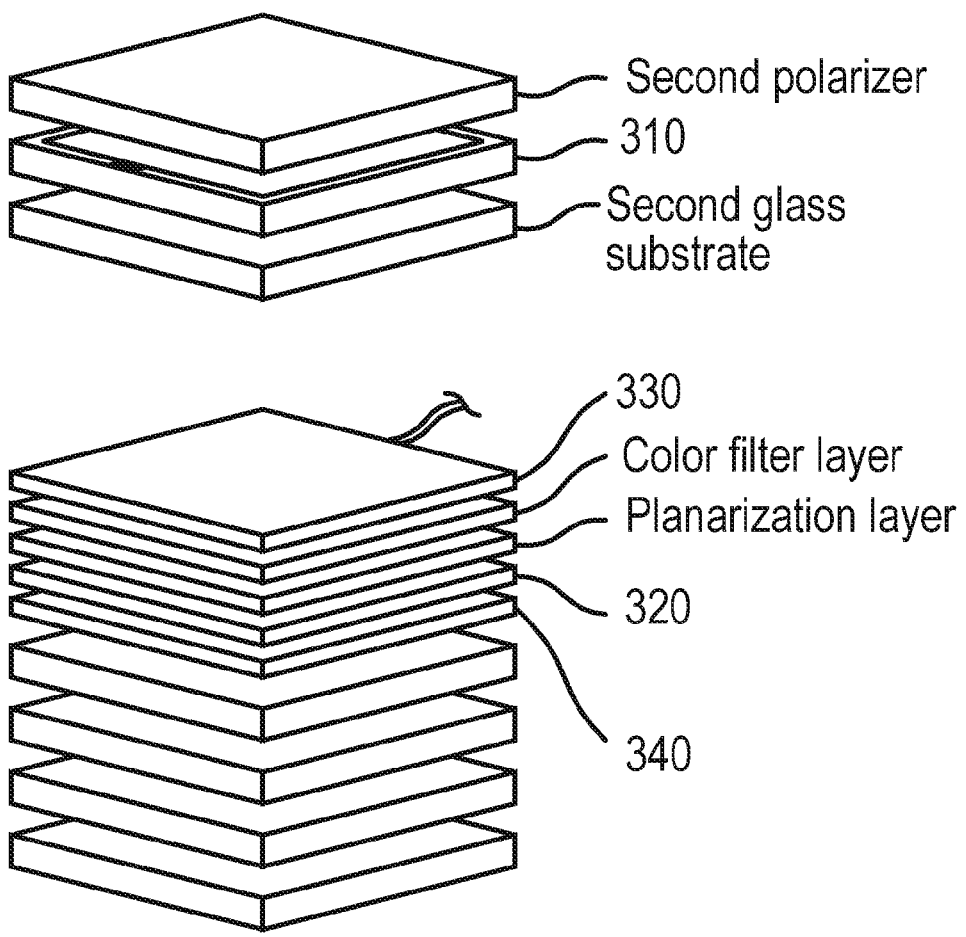
FIG. 3 is a schematic view of a typical noise reduction.
Figure 4:
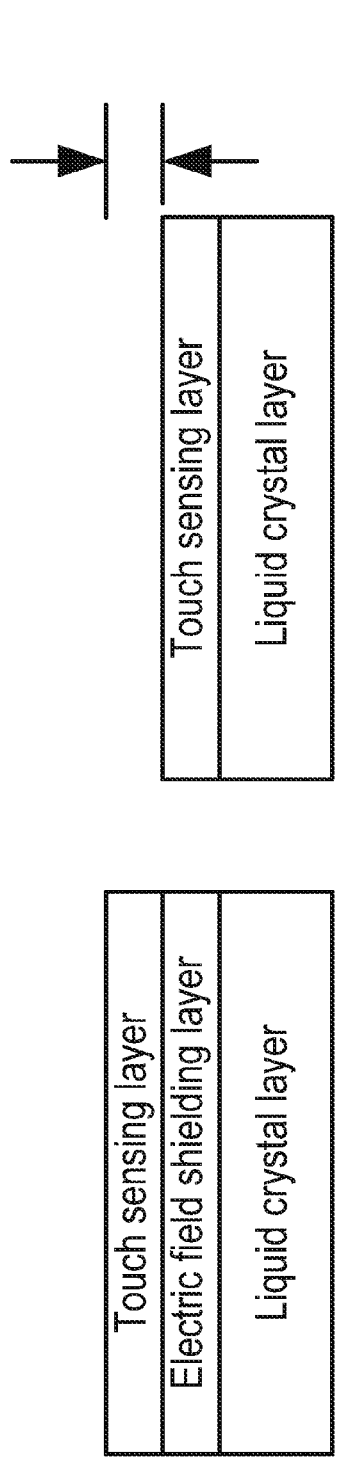
FIG. 4 schematically illustrates the use of the electric field shielding layer.
Figure 5:
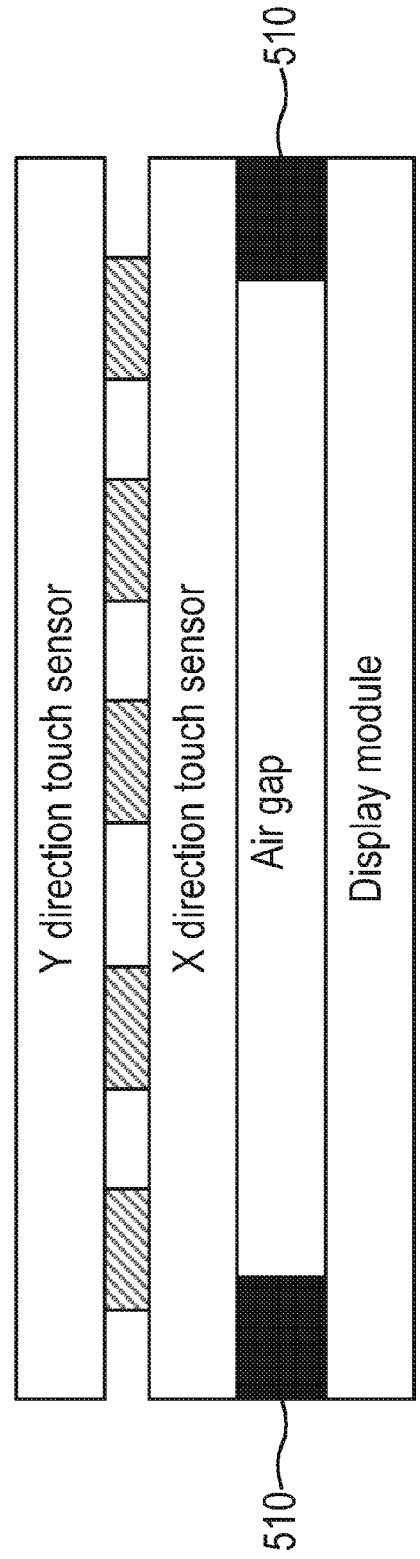
FIG. 5 schematically illustrates the use of an air gap to isolate the noises.
Figure 6:
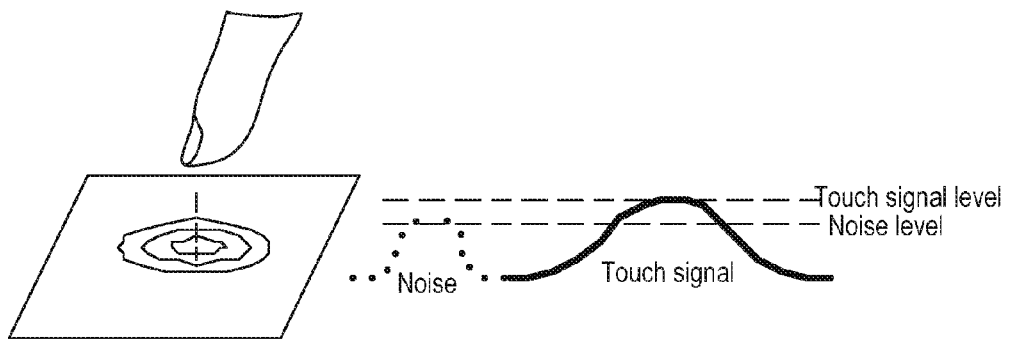
FIG. 6 is a schematic diagram of a typical hovering touch.
Figure 7:
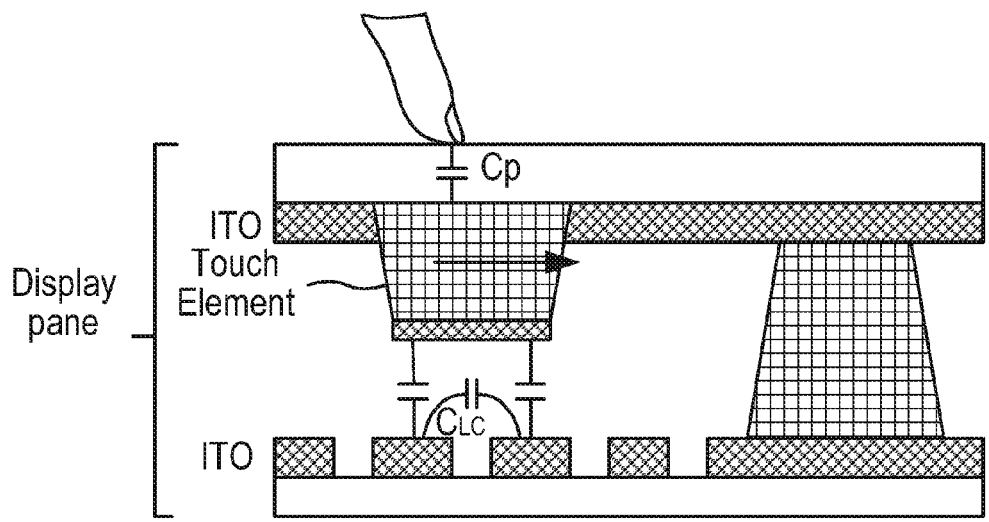
FIG. 7 is a schematic view of a typical in-cell configuration for achieving the hovering touch.
Figure 8:
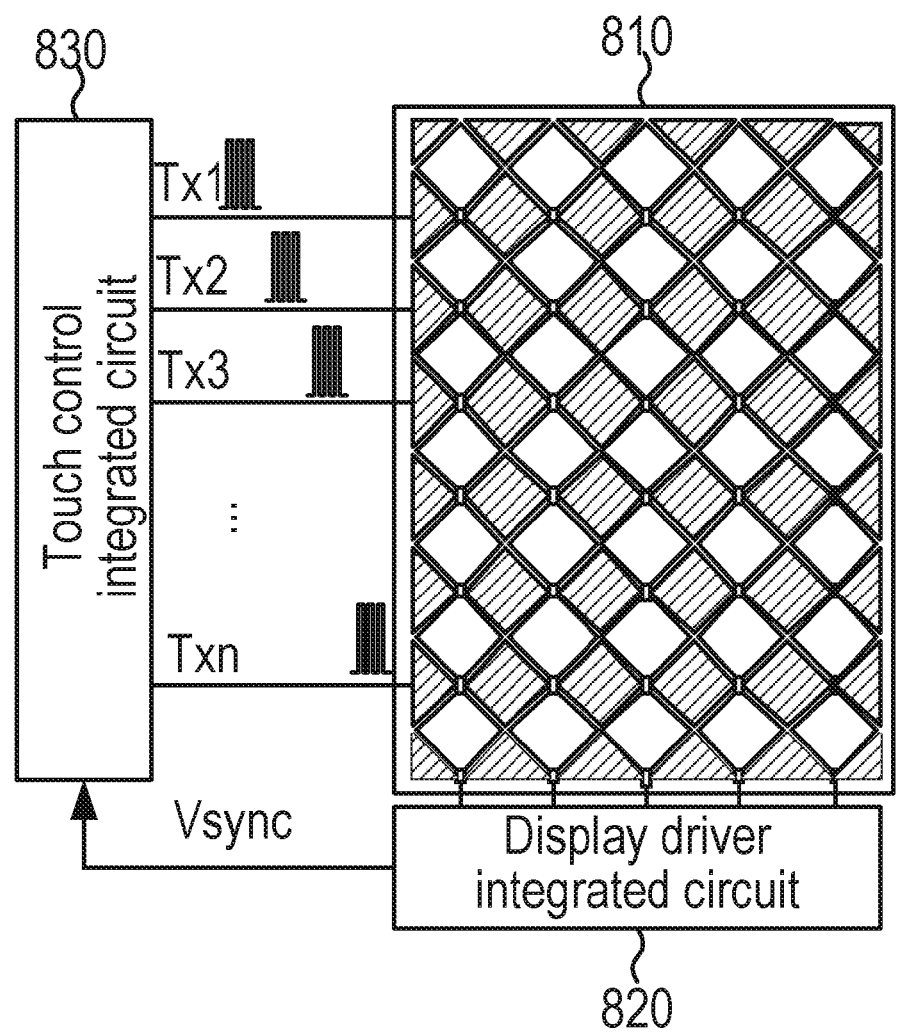
FIG. 8 is a block diagram of a touch sensing system for avoiding display noises according to an embodiment of the present invention.

FIG. 8 is a schematic diagram of a touch sensing system 800 for avoiding display noises according to an embodiment of the present invention. As shown, the touch sensing system 800 includes a touch display panel 810, a display driver integrated circuit 820, and a touch control integrated circuit 830.

The touch display panel 810 is provided to display image and sense a touch position. The display driver integrated circuit 820 is connected to the touch display panel 810 for driving transistors and capacitors of corresponding pixels based on display pixel signal and display driving signal, thereby performing a display operation. The touch control integrated circuit 830 is connected to the touch display panel 810 and the display driver integrated circuit 820. According to a vertical synchronous signal Vsync outputted from the display driver integrated circuit 820, the touch control integrated circuit 830 performs a touch sensing on the touch display panel 810 in a vertical blanking interval (VBI) to generate a first set of touch sensing position data, and performs a touch sensing on the touch display panel 810 in a non-vertical blanking interval (non-VBI) to generate a second set of touch sensing position data. The touch control integrated circuit 830 further updates the second set of touch sensing position data according to the first set of touch sensing position data.

The touch control integrated circuit 830 takes an average of the second set of touch position data and the first set of touch position data to update the second set of touch position data. In this embodiment, the touch control integrated circuit 830 performs a mutual-capacitance sequential driving and single-line sensing, i.e., driving the touch driving lines Tx sequentially and reading the touch sensing lines Rx one by one, in the VBI, and performs at least a mutual-capacitance sequential driving and differential sensing, i.e., driving the touch driving lines Tx sequentially and reading the touch sensing lines Rx differentially in which the sensing value of touch sensing line Rx(i) is a difference between the read value of touch sensing line Rx(i) and the read value of touch sensing line Rx(i-1), in the non-VBI.

Figure 9:
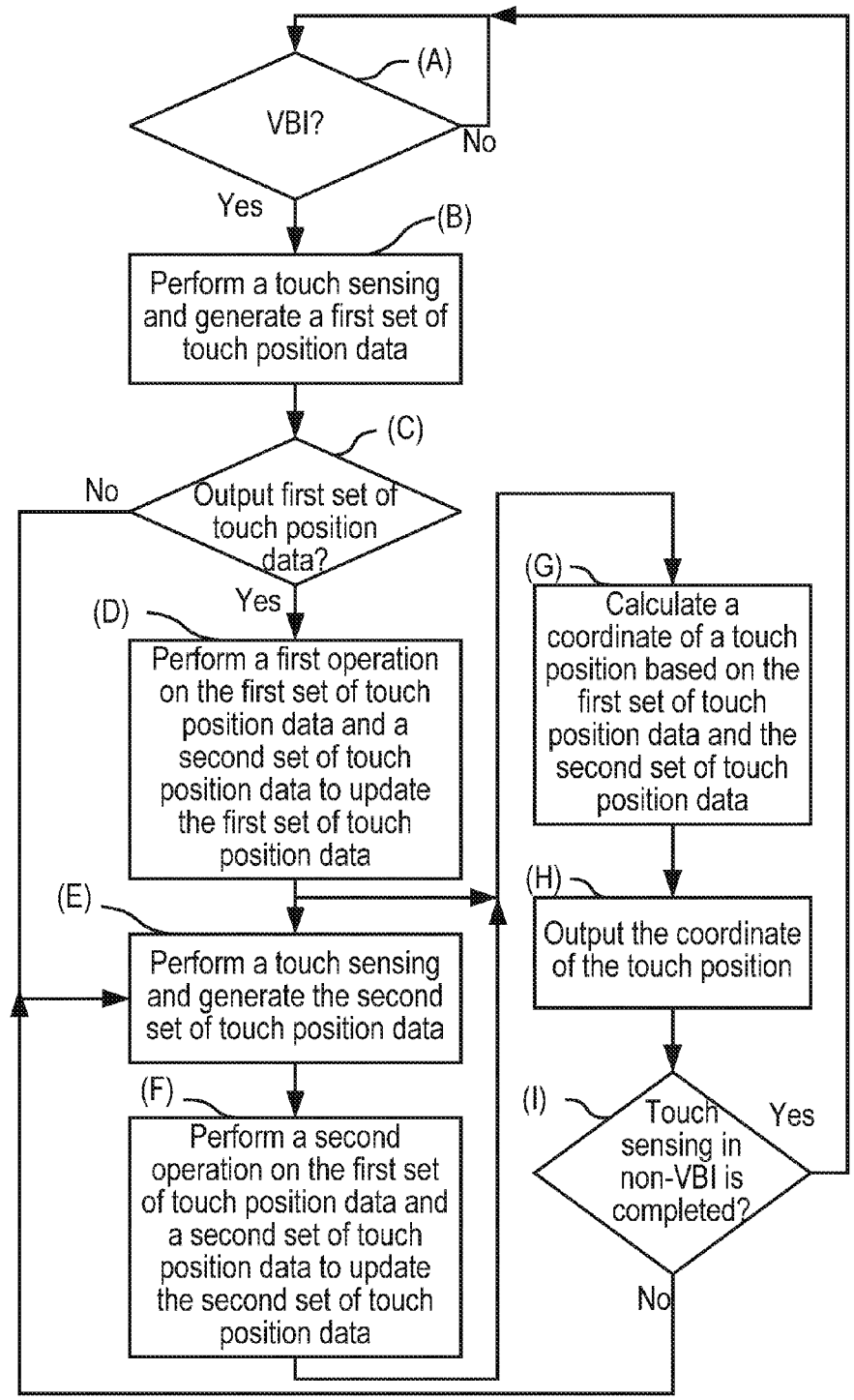
FIG. 9 schematically illustrates a flowchart of a touch sensing method for avoiding display noises according to the present invention.

FIG. 9 schematically illustrates a flowchart of a touch sensing method for avoiding display noises according to one embodiment of the present invention. The method can be used in the touch sensing system 800 shown in FIG. 8, which includes the touch display panel 810, the display driver integrated circuit 820, and the touch control integrated circuit 830. The display driver integrated circuit 820 drives the touch display panel 810 for displaying image. The touch control integrated circuit 830 is based on the vertical synchronous signal (Vsync) of the display driver integrated circuit 820 for driving the touch display panel 810, so as to detect at least one touch position on the touch display panel 810. In the method, the touch control integrated circuit 830 first detects the vertical synchronous signal (Vsync) and determines whether a vertical blanking interval (VBI) has been initiated or not (step (A)). The vertical synchronous signal (Vsync) normally is a low voltage and, when entering the VBI, it becomes a high voltage as an indication of the VBI.

When the vertical blanking interval (VBI) has been initiated and is determined in step (A), the touch control integrated circuit 830 performs a touch sensing on the touch display panel 810 and generates a first set of touch position data (Data1) in step (B). If the vertical blanking interval has not yet been initiated in step (A), this step is repeated until the vertical blanking interval is initiated.

When performing touch sensing on the display panel 810, the touch control integrated circuit 830 has to be coupled with the vertical synchronous signal (Vsync) of the display driver integrated circuit 820. Namely, the touch control integrated circuit 830 has to wait for receiving the vertical synchronous signal and then performs touch sensing in the VBI. In some embodiments, the touch sensing can be self-capacitance, mutual-capacitance, or electromagnetic type touch sensing.

In this embodiment, the touch control integrated circuit 830 adopts the mutual-capacitance touch sensing. The mutual-capacitance touch sensing can be divided into sequential driving and single-line sensing scheme, sequential driving and differential sensing scheme, and sequential driving and multi-line sensing scheme. In this embodiment, the sequential driving and single-line sensing scheme is used in combination with the sequential driving and differential sensing scheme. In other embodiments, the self-capacitance touch sensing can be adopted in combination with the mutual-capacitance touch sensing to filter out the display noises.

Figure 10:
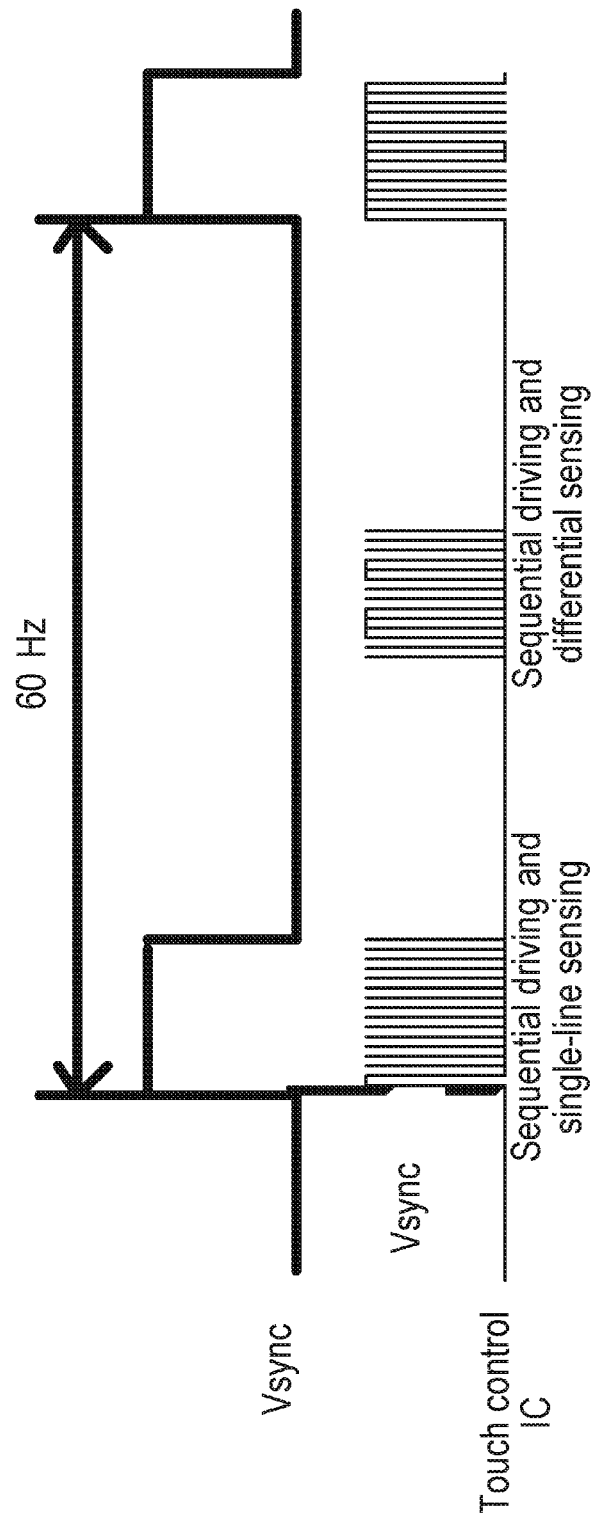
FIG. 10 is a schematic graph of performing touch sensing according to the present invention.

In this embodiment, the vertical synchronous signal is a high voltage to indicate a VBI, and thus the touch control integrated circuit 830 starts to perform touch sensing as the vertical synchronous signal of high voltage is received. FIG. 10 is a schematic graph of performing touch sensing according to one embodiment of the present invention. As shown in FIG. 10, in the VBI, the touch sensing is performed by the sequential driving and single-line sensing scheme, and the number of driving and sensing for the touch sensing in the VBI can be adjusted according to the report rate, but not limited to one time. The touch sensing may not be limited to being performed by one single type of scheme and may be performed by more than one type of scheme in combination. In this embodiment, one time of sequential driving and single-line sensing scheme is performed in the VBI.

The result of driving and sensing, the first set of touch position data (Data1), is reserved for calculating the coordinate of a touch point. The reserved data is used to filter out the noises in the non-VBI.

When the vertical blanking interval has not yet been initiated in step (A), this step is executed repeatedly until the vertical blanking interval is initiated.

In step (C), the touch control integrated circuit 830 determines whether to output the first set of touch position data (Data1).

When the first set of touch position data (Data1) is determined to output in step (C), the touch control integrated circuit 830 performs a first operation on the first set of touch position data (Data1) and a second set of touch position data (Data2) in step (D), so as to update and output the first set of touch position data (Data1). When the first set of touch position data (Data1) is determines not to output in step (C), step (E) is executed.

When the sequential driving and single-line sensing in step (B) is completed, the data is reserved as the first set of touch position data (Data1) by the touch control integrated circuit 830 and can be determined whether to output as the coordinate of touch position in step (C). If determined to output the coordinate, a data comparison is performed. Meanwhile, a first operation on the first set of touch position data (Data1) and a second set of touch position data (Data2) is performed. After the first operation the first set of touch position data (Data1) is updated and the second set of touch position data (Data2) is the latest data of the previous touch detecting frame. In this embodiment, the vertical synchronous signal (Vsync) is used as an indication for fetching the first touch position data (Data1), and thus the touch detecting frame is synchronous to the display frame.

The first operation is provided to add data of the first set of touch position data (Data1) with corresponding data of the second set of touch position data (Data2), and divides the added data by two, so as to update the data of the first set of touch position data (Data1).

As compared to the second set of touch position data (Data2) obtained in the non-VBI, the first set of touch position data (Data1) in the VBI is less susceptible to noises, and thus the first operation may neglect the second set of touch position data (Data2) and directly output the first set of touch position data (Data1). Namely, the first set of touch position data (Data1) in the VBI can be directly used to calculate the coordinate for output without the data comparison.

In step (E), the touch control integrated circuit 830 performs touch sensing on the touch display panel 810 in the non-VBI, so as to generate a set of touch position data and update the set of touch position data as the second set of touch position data (Data2).

After the VBI is completed, the non-VBI is initiated. The touch control integrated circuit 830 performs at least a sequential driving and differential sensing in the non-VBI. The sequential driving and differential sensing does not have to be performed where the vertical synchronous signal (Vsync) is transited from high voltage to low voltage. Alternatively, it can be performed during the period between two high-voltage vertical synchronous signals (Vsync). In one embodiment, the sequential driving and differential sensing is performed not limited to one time, it could be performed several times, while the touch sensing may include more than one type of driving scheme in combination. In this embodiment, the sequential driving and differential sensing is performed once. When the sequential driving and differential sensing is completed, one set of touch position data is obtained and updated as the second set of touch position data (Data2).

In step (F), the touch control integrated circuit 830 performs a second operation to the second set of touch position data and the first set of touch position data, so as to update the second set of touch position data for output. Specifically, in the second operation data of the second set of touch position data (Data2) is added with the corresponding data of the first set of touch position data (Data1), and the added data is divided by two, the result data is to update the data in the second set of touch position data (Data2).

Figure 11C:
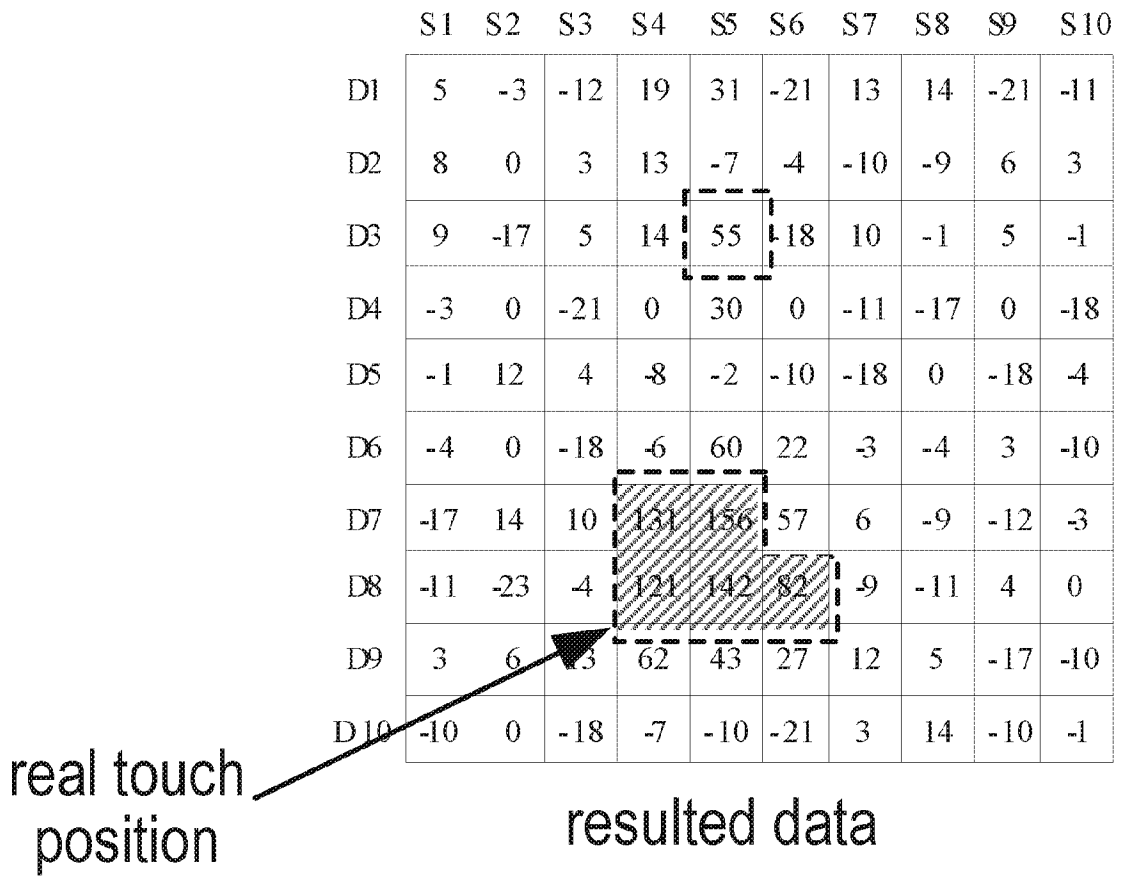

FIGS. 11A to 11C are schematic diagrams illustrating the operations of the touch sensing system according to one embodiment of the present invention. FIG. 11A shows the values of the first set of touch position data (Data1) according to the embodiment of the present invention. FIG. 11B shows the values of the second set of touch position data (Data2) according to the embodiment of the present invention. FIG. 11C is a schematic diagram of performing an operation on the first set of touch position data (Data1) and the second set of touch position data (Data2) according to the embodiment of the present invention. As shown in FIG. 11C, the operation is provided to add data of the first set of touch position data (Data1) and the corresponding data of the second set of touch position data (Data2), and divide the added data by two.

In FIG. 11B, the intersection of D3 and S5 is a false point, and its value is decreased after the operation. Thus, the false point is not regarded as a touch point. Since the display driver integrated circuit 820 drives the touch display panel 810 to display a frame in the non-VBL, the noise is more obvious. According to the system and method in the embodiment of the present invention, the noise is halved, and thus the SNR is increased by at least 50%.

In step (G), the touch control integrated circuit 830 calculates a coordinate of the touch position in the VBI based on the first set of touch position data (Data1) outputted in step (D) and calculates a coordinate of the touch position in the non-VBI based on the second set of touch position data (Data2) outputted in step (F).

In step (H), the touch control integrated circuit 830 outputs the coordinate of the touch position. In step (I), the touch control integrated circuit 830 determines whether the touch sensing in the non-VBI is completed and, if yes, step (A) is executed again. If step (I) determines that the touch sensing in the non-VBI is not completed, step (E) is executed again.

As explained above, it is known that the touch control integrated circuit 830 may use self-capacitance, mutual-capacitance, electromagnetic, or resistive type method for touch sensing in steps (B) and (E). When using the mutual-capacitance method, the touch control integrated circuit 830 adopts sequential driving and single-line sensing, sequential driving and differential sensing, or sequential driving and multi-line sensing.

From FIGS. 11A to 11C, it is known that, after data processing, the noise level of the false point generated from the sequential driving and differential sensing in the non-VBI is greatly reduced, and this operated data is reserved in step (F) for use as the second set of touch position data (Data2) to perform the first operation with the first set of touch position data (Data1) in step (D) for a next touch detecting frame. The second set of touch position data (Data2) is used in step (G) for coordinate calculation, so as to obtain more accurate coordinate of report point.

In view of the foregoing, it is known that according to the present invention the influence of the display noise can be eliminated and avoided by simply connecting the vertical synchronous signal (Vsync) of the display driver integrated circuit 820 to the touch control integrated circuit 830 for synchronization without increasing the thickness of the touch sensing system 800, and is compatible with on-cell or in-cell type touch display, so as to increase the accuracy of the touch sensing and effectively reduce the manufacturing cost. In addition, the present invention can also perform touch sensing in the non-VBI, so as to effectively increase the report rate.

Although the present invention has been explained in relation to its preferred embodiment, it is to be understood that many other possible modifications and variations can be made without departing from the spirit and scope of the invention as hereinafter claimed.

What is claimed is:

1. A touch sensing method for avoiding display noises, which is applied to a touch display system having a touch display panel, a display driver integrated circuit, and a touch control integrated circuit, the display driver integrated circuit driving the touch display panel for displaying image, the touch control integrated circuit driving the touch display panel based on a vertical synchronous signal outputted from the display driver integrated circuit to detect at least one touch position on the touch display panel, the touch sensing method comprising steps of:

(A) the touch control integrated circuit detecting the vertical synchronous signal to determine that a vertical blanking interval is initiated;

(B) the touch control integrated circuit performing a touch sensing on the touch display panel, so as to generate a first set of touch position data;

(C) the touch control integrated circuit determining that the first set of touch position data is outputted;

(D) the touch control integrated circuit performing a first operation to the first set of touch position data and a second set of touch position data, so as to update the first set of touch position data for output;

(E) the touch control integrated circuit performing a touch sensing to the touch display panel in a non-vertical blanking interval, so as to generate a set of touch position data and update the set of touch position data as the second set of touch position data;

(F) the touch control integrated circuit performing a second operation on the second set of touch position data and the first set of touch position data, so as to update the second set of touch position data for output;

(G) the touch control integrated circuit calculating a coordinate of the touch position in the vertical blanking interval based on the first set of touch position data outputted in step (D) and calculating a coordinate of the touch position in the non-vertical blanking interval based on the second set of touch position data outputted in step (F);

(H) the touch control integrated circuit outputting a coordinate of the touch position; and (I) executing step (A) if the touch control integrated circuit determines that the touch sensing in the non-vertical blanking interval is completed.

2. The touch sensing method as claimed in claim 1, wherein, in step (D), step (E) is executed if the touch control integrated circuit determines that the touch sensing in the non-vertical blanking interval is not yet completed.

3. The touch sensing method as claimed in claim 2, further comprising, after step (C), a step (C') in which the touch control integrated circuit determines that the first set of touch position data is not yet outputted and then step (E) is executed.

4. The touch sensing method as claimed in claim 3, wherein in step (A), the touch control integrated circuit continues detection until a vertical blanking interval is initiated.

5. The touch sensing method as claimed in claim 4, wherein the touch control integrated circuit performs a self-capacitance, mutual-capacitance, electromagnetic, or resistive touch sensing scheme in step (B) and step (E).

6. The touch sensing method as claimed in claim 4, wherein, when a mutual-capacitance touch sensing scheme is applied in step (E) and step (F), the touch control integrated circuit adopts a sequential driving and single-line sensing, a sequential driving and differential sensing, or a sequential driving and multi-line sensing.

7. The touch sensing method as claimed in claim 4, wherein the first operation in step (D) adds data of the first set of touch position data with corresponding data of the second set of touch position data, and divides the added data by two, so as to update the data of the first set of touch position data.

8. The touch sensing method as claimed in claim 4, wherein the first operation in step (D) outputs the first set of touch position data without data comparison of the first set of touch position data with the second set of touch position data.

9. The touch sensing method as claimed in claim 4, wherein the second operation in step (F) adds data of the second set of touch position data with corresponding data of the first set of touch position data, and divides the added data by two, so as to update the data of the second set of touch position data.

10. A touch sensing system for avoiding display noises, comprising:
a touch display panel for displaying image and detecting a touch position;
a display driver integrated circuit connected to the touch display panel for driving transistors and capacitors of corresponding pixels based on a display pixel signal and a display driving signal thereby performing a display operation; and
a touch control integrated circuit connected to the touch display panel and the display driver integrated circuit;
wherein the touch control integrated circuit performs a touch sensing on the touch display panel in a vertical blanking interval based on a vertical synchronous signal outputted from the display driver integrated circuit to generate a first set of touch position data, and perform a touch sensing on the touch display panel in a non-vertical blanking interval to generate a second set of touch position data, so that the touch control integrated circuit updates the second set of touch position data based on the first set of touch position data.

11. The touch sensing system as claimed in claim 10, wherein the touch control integrated circuit adds data of the second set of touch position data with corresponding data of the first set of touch position data, and divides the added data two, so as to update the data of the second set of touch position data.

12. The touch sensing system as claimed in claim 11, wherein the touch control integrated circuit performs a mutual-capacitance sequential driving and single-line sensing in the vertical blanking interval and performs a mutual-capacitance sequential driving and differential sensing in the non-vertical blanking interval.

* * * * *